United States Patent Office 2,848,811
Patented Aug. 26, 1958

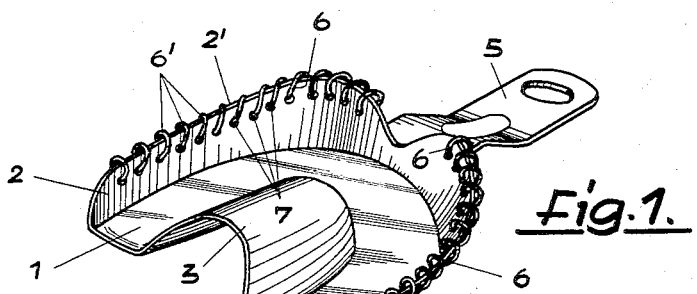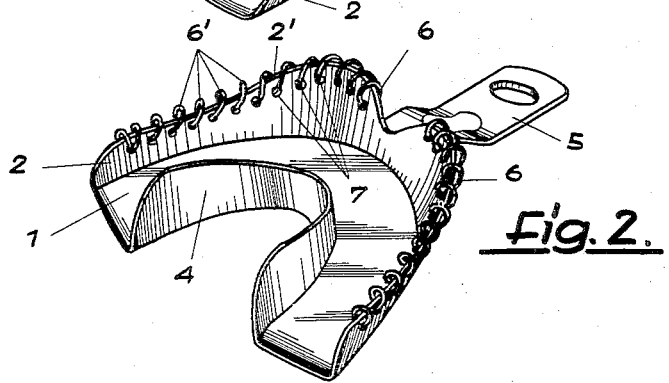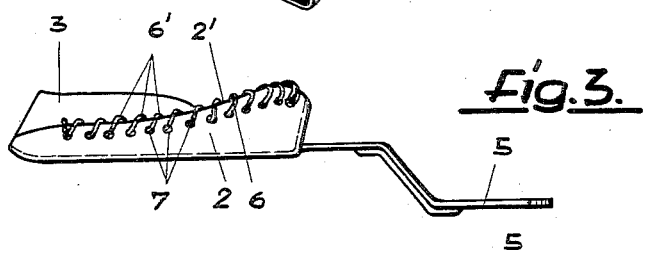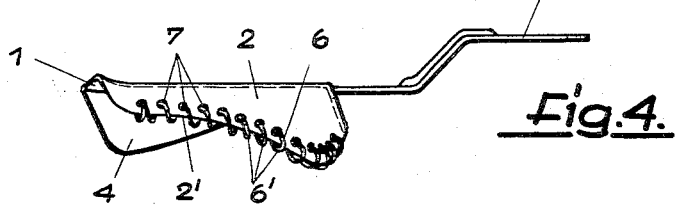

2,848,811
DENTAL IMPRESSION TRAY

Klausdieter Wagner, Tuttlingen (Baden-Wurttemberg), Germany, assignor to Aktiengesellschaft für Feinmechanik vormals Jetter & Scheerer, Tuttlingen (Baden-Wurttemberg), Germany Application May 25, 1956, Serial No. 587,353

8 Claims. (Cl. 32—19)

The present invention relates to a dental impression tray, and more particularly it relates to a dental impression tray in which a plastic material may be accommodated for the purpose of forming a dental impression.

Dental impression trays serve for forming molds corresponding to the dental and maxillary portions of the human mouth. For this purpose either gypsum or plastic materials such as alginates are used as molding material and are placed in the cavity of the dental impression tray prior to insertion of the same into the mouth of a patient. Different sizes and shapes of dental impression trays are required in order to accommodate the variations in the shape of the maxillary and dental portions of patients. Differently shaped dental impression trays are used for the upper and the lower jaw portions.

When gypsum is used as the molding material, it is necessary that the inner surface of the dental impression tray be smooth so that the gypsum in which the impression has been formed can be easily removed from the impression tray. Contrary thereto, if alginates are used as the molding material, the dental impression tray must contain portions which will retain alginate material in which the impression has been formed in the cavity of the impression tray.

Irrespective of the type of molding materials used, it is desirable that any surplus of the molding material may easily flow off in the direction of the muco buccal fold of the patient. Easy removal of surplus molding material is necessary in order to obtain as complete and accurate as possible a mold of the jaw and dental portion. In order to retain a plastic molding material such as an alginate in the dental impression tray, it has been suggested to bend the outer wall of the tray inwardly so that the inwardly bent portion of the tray wall will give support to the plastic material contained in the cavity of the tray. However such an arrangement does not facilitate the free flowing off of excess molding material. In order to facilitate the free flowing off of excess molding material it has also been suggested to outwardly bend the free end portion of the outer wall of the dental impression tray. Such an arrangement is, however, limited to the use of gypsum as molding material, since it does not provide any means for retaining a plastic molding material such as an alginate within the cavity of the dental impression tray.

It is therefore an object of the present invention to overcome the aforementioned disadvantages of dental impression trays.

It is another object of the present invention to provide a dental impression tray which is so formed as to permit free flowing off of excess molding material.

It is yet another object of the present invention to provide a dental impression tray which is so formed as to securely retain a plastic molding material such as an alginate within the cavity of the dental impression tray, while still permitting free flowing off of excess molding material.

It is a further object of the present invention to provide a dental impression tray which may be used with gypsum as well as alginate-like molding materials.

It is yet another object of the present invention to provide a dental impression tray which may be easily and economically produced.

Other objects and advantages of the present invention will become apparent from a further reading of the description and the appended claims.

With the above objects in view the present invention mainly consists in a dental impression tray comprising in combination a tray formed with a substantially U-shaped cavity in which a plastic material may be accommodated, the cavity being defined in part by an outer wall of the tray having a free edge, and a plurality of spacer portions carried by the outer wall, spaced from each other, and extending beyond the free edge of the outer wall, so that when the tray is used excess material therein may freely flow past the edge of the outer wall through the spaces between the spacer portions.

In a preferred embodiment the present invention also contemplates a dental impression tray comprising in combination a tray formed with a substantially U-shaped cavity in which a plastic material may be accommodated, the cavity being defined in part by an outer wall of the tray having a free edge and being formed with a row of holes extending substantially parallel to the free edge, and by a second wall joined to the outer wall at an edge thereof opposite the free edge, and a plurality of interconnected spacer portions formed by at least one spirally wound spacer wire extending along a helical path having a predetermined diameter, the spacer wire being carried by the outer wall and passing through a plurality of the holes of the row of holes, the spacer wire including upper portions extending beyond the free edge of the outer wall in a direction away from the second wall and away from the cavity, the predetermined diameter being greater than the distance of the row of holes from the free edge so that when the tray is used excess material therein may freely flow past the edge of the outer wall through the spaces between the spacer portions.

According to the present invention, a dental impression tray provided with simple and effective means for retaining the molding material and for permitting the free flow-off of excess molding material is formed by arranging thereon spacer portions extending beyond the free edge of the outer wall of the dental impression tray, and spacing the individual spacer portions at such distance from each other that excess material may freely flow off between adjacent spacer portions. Preferably individual spacer portions of at least each side of the impression tray are then interconnected by portions which also connect the spacer portions with the outer wall of the impression tray.

According to a preferred embodiment of the present invention, the plurality of spacer portions is formed by a spirally wound spacer wire or band which passes through a row of holes formed in the outer wall of the impression tray and arranged parallel to the free edge of the outer wall. The spacer wire, according to this preferred embodiment of the present invention, passes from one of the holes in the row of holes in the outer wall of the impression tray upwardly on the inner side of the outer wall beyond the free edge of the outer wall and continues on the outer side of the outer wall downwardly to the next following hole therein. Thereby the spacer wire extends along a helical path which has a diameter greater than the distance from the holes in the outer wall of the impression tray to the free edge thereof, so that the upper portions of the helical spacer wire will be upwardly spaced from the free edge of the outer wall of the impression tray.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a perspective view of an impression tray for the upper jaw according to the present invention;

Fig. 2 is a perspective view of an impression tray for the lower jaw according to the present invention;

Fig. 3 is a partial lateral view of an impression tray for the upper jaw according to the present invention; and Fig. 4 is a partial lateral view of an impression tray for the lower jaw according to the present invention.

Referring now to the drawing, the impression tray according to the present invention has the customary overall horseshoe-shaped form and includes an outer wall 2 having a free edge 2'. A second or bottom wall 1 is joined to outer wall 2 at its edge which is opposite to free edge 2'. As shown in Fig. 1, the impression tray for the upper jaw is formed with an arc-like center portion 3, and, as shown in Fig. 2, the impression tray for the lower jaw is formed with an inner wall 4. The tray for forming impressions of the upper jaw as well as the tray for forming impressions of portions of the lower jaw are both provided with a handle 5.

In the illustrated embodiment, spacer portions 6' are formed by the upwardly extending portions of a spirally wound spacer wire 6. Spirally wound spacer wire 6 passes through successive holes 7 arranged in a row in outer wall 2. The row of holes 7 extends substantially parallel to the free edge 2' of outer wall 2.

Thus the outer portions of the spirally wound spacer wire 6 extends in a direction away from the bottom or second wall 1 and away from the cavity formed in part by walls 1 and 2. These spacer portions are interconnected by the inner and lower portions of the spirally wound spacer wire, whereby the lower portions of the spacer wire pass through successive holes 7. Adjacent spacer portions are spaced from each other by a distance substantially equal to the pitch of the spirally wound spacer wire.

According to a preferred embodiment of the present invention, the diameter defined by the helical path of the spirally wound spacer wire is about 4.2 mm., the diameter of the spacer wire is about 0.5 mm., the holes formed in outer wall 2 of the dental impression tray have a diameter of about 1.5 mm., and the distance of adjacent holes from each other and consequently the pitch of the spiral formed by the wire is about 4 mm. The distance from holes 7 to the free edge 2' is about 3 mm.

Thereby it is achieved that the spirally wound wire 6 does not rest on the free edge 2' of outer wall 2. When it is desired to use in place of the spirally wound round wire a spirally wound band, circular holes 7 have to be replaced with slots of such dimensions that the spacer band can easily pass therethrough.

The band or wire may be wound in screw-like fashion either about the entire free edge, or about a portion of the free edge of the outer wall of the impression tray. According to the illustrated embodiment, a spirally wound wire embraces substantially one side of the free edge of the impression tray and terminates in the vicinity of the center portion and the handle 5.

While the spirally wound spacer member 6 has been described above as a wire or a band, the present invention is not limited to the preferred embodiments thereof wherein the spacer member has the shape of either a wire or a band.

Surprisingly it has been found that the dental impression tray according to the present invention permits simultaneously the free flowing off of molding material and the spacing of the buccal membrane from the outer wall of the dental impression tray. The resiliency of the spirally wound spacer member permits after separation of the mold formed therein from the impression tray, an easy and simple removal of any remaining portions of the molding material, while the cleaning of prior art impression trays provided with rigid mold retaining means could be accomplished only in a complicated and time consuming manner.

Furthermore the consumption of plastic molding material is considerably reduced by using the dental impression tray of the present invention, since only very small quantities of molding material are retained in the windings of the spirally wound spacer member. Finally, in the production of dental impression trays according to the present invention it is possible to use one and the same stamping tools for forming impression trays in which either gypsum or alginates and the like may be employed as molding material.

The impression trays according to the invention may be used with alginate-like molding materials, when they are provided with the spacer members 6. The same impression trays without the spacer members 6 however may be used with gypsum.

It will be understood that each of the elements described above, or two or more together, may also find a useful application in other types of dental impression trays differing from the types described above.

While the invention has been illustrated and described as embodied in a dental impression tray, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptions should and are intended to be comprehended within the meaning and range of equivalence of the following claims.

What is claimed as new and desired to be secured by Letters Patent is:

1. A dental impression tray comprising, in combination, a tray formed with a substantially U-shaped cavity in which a plastic material may be accommodated, said cavity being defined in part by an outer wall of the tray having a free edge and by a second wall joined to said outer wall at an edge thereof opposite said free edge; and a plurality of spacer portions carried by said outer wall, spaced from each other, and extending beyond said free edge of said outer wall in a direction away from said second wall and away from said cavity, so that when the tray is used excess material therein may freely flow past said edge of said outer wall through the spaces between said spacer portions, at least some of said spacer portions being interconnected by portions which are connected to said outer wall.

2. A dental impression tray comprising, in combination, a tray formed with a substantially U-shaped cavity in which a plastic material may be accommodated, said cavity being defined in part by an outer wall of the tray having a free edge and being formed with a row of holes extending substantially parallel to said free edge, and by a second wall joined to said outer wall at an edge thereof opposite said free edge; and a plurality of spacer portions carried by said outer wall, spaced from each other and passing through said holes, respectively, said spacer portions extending beyond said free edge of said outer wall in a direction away from said second wall and away from said cavity, so that when the tray is used excess material therein may freely flow past said edge of said outer wall through the spaces between said spacer portions.

3. A dental impression tray comprising, in combination, a tray formed with a substantially U-shaped cavity in which a plastic material may be accommodated, said cavity being defined in part by an outer wall of the tray having a free edge and being formed with a row of holes extending substantially parallel to said free edge, and by a second wall joined to said outer wall at an edge thereof opposite said free edge; and a plurality of interconnected spacer portions carried by said outer wall, spaced from each other and passing through said holes, respectively, said spacer portions extending beyond said free edge of said outer wall in a direction away from said second wall and away from said cavity, so that when the tray is used excess material therein may freely flow past said edge of said outer wall through the spaces between said spacer portions.

4. A dental impression tray comprising, in combination, a tray formed with a substantially U-shaped cavity in which a plastic material may be accommodated, said cavity being defined in part by an outer wall of the tray having a free edge and being formed with a row of holes extending substantially parallel to said free edge, and by a second wall joined to said outer wall at an edge thereof opposite said free edge; and a plurality of interconnected spacer portions formed by at least one spirally wound spacer wire carried by said outer wall and passing through a plurality of said holes of said row of holes, said spacer wire including upper portions extending beyond said free edge of said outer wall in a direction away from said second wall and away from said cavity so that when the tray is used excess material therein may freely flow past said edge of said outer wall through the spaces between said spacer portions.

5. A dental impression tray comprising, in combination, a tray formed with a substantially U-shaped cavity in which a plastic material may be accommodated, said cavity being defined in part by an outer wall of the tray having a free edge and being formed with a row of holes extending substantially parallel to said free edge, and by a second wall joined to said outer wall at an edge thereof opposite said free edge; and a plurality of interconnected spacer portions formed by at least one spirally wound spacer wire extending along a helical path having a predetermined diameter, said spacer wire being carried by said outer wall and passing through a plurality of said holes of said row of holes, said spacer wire including upper portions extending beyond free edge of said outer wall in a direction away from said second wall and away from said cavity, said predetermined diameter being greater than the distance of said row of holes from said free edge so that when the tray is used excess material therein may freely flow past said edge of said outer wall through the spaces between said spacer portions.

6. A dental impression tray comprising, in combination, a tray formed with a substantially U-shaped cavity in which a plastic material may be accommodated, said cavity being defined in part by an outer wall of the tray having a free edge; and a plurality of spacer portions carried by said outer wall, spaced from each other, and extending beyond said free edge of said outer wall, at least some of said spacer portions being interconnected by portions which are connected to said outer wall, so that when the tray is used excess material therein may freely flow past said edge of said outer wall through the spaces between said spacer portions.

7. A dental impression tray comprising, in combination, a tray formed with a substantially U-shaped cavity in which a plastic material may be accommodated, said cavity being defined in part by an outer wall of the tray having a free edge and being formed with a row of slots extending substantially parallel to said free edge, and by a second wall joined to said outer wall at an edge thereof opposite said free edge; and a plurality of interconnected spacer portions formed by at least one spirally wound spacer band carried by said outer wall and passing through a plurality of said slots of said row of slots, said spacer band including upper portions extending beyond said free edge of said outer wall in a direction away from said second wall and away from said cavity so that when the tray is used excess material therein may freely flow past said edge of said outer wall through the spaces between said spacer portions.

8. A dental impression tray comprising, in combination, a tray formed with a substantially U-shaped cavity in which a plastic material may be accommodated, said cavity being defined in part by an outer wall of the tray having a free edge and being formed with a row of holes extending substantially parallel to said free edge, and by a second wall joined to said outer wall at an edge thereof opposite said free edge; and a plurality of interconnected spacer portions formed by at least one spirally wound resilient spacer member carried by said outer wall and passing through a plurality of said holes of said row of holes, said spacer member including upper portions extending beyond said free edge of said outer wall in a direction away from said second wall and away from said cavity so that when the tray is used excess material therein may freely flow past said edge of said outer wall through the spaces between said spacer portions.

References Cited in the file of this patent

UNITED STATES PATENTS

| | | |
|---|---|---|
| 307,579 | Palmiter | Nov. 4, 1884 |
| 2,657,461 | Sweeney | Nov. 3, 1953 |